United States Patent Office 3,471,452
Patented Oct. 7, 1969

3,471,452
PREPARATION OF LINEAR POLYAMIDES USING A TEMPERATURE DIFFERENTIAL
Ernest Haworth and John Norman Minford, Blackley, Manchester, England, assignors to Imperial Chemical Industries Limited, London, England, a corporation of Great Britain
Filed Apr. 28, 1966, Ser. No. 546,075
Claims priority, application Great Britain, Apr. 30, 1965, 18,330/65; Mar. 25, 1966, 13,442/66
Int. Cl. C08g 20/20, 20/24
U.S. Cl. 260—78
6 Claims

ABSTRACT OF THE DISCLOSURE

A process for the production of synthetic fiber-forming polyamides in a reaction vessel wherein, for at least during the latter stages of the reaction, the temperature applied to the liquid polyamide forming reaction mixture is higher than the temperature applied to the vapors produced from said reaction mixture. The differential temperatures maintained in the reaction vessel reduce or eliminate decomposition products formed in the vapor zone above the liquid reaction mixture, thus reducing the requirements for cleaning the reaction zone.

Figure 1:
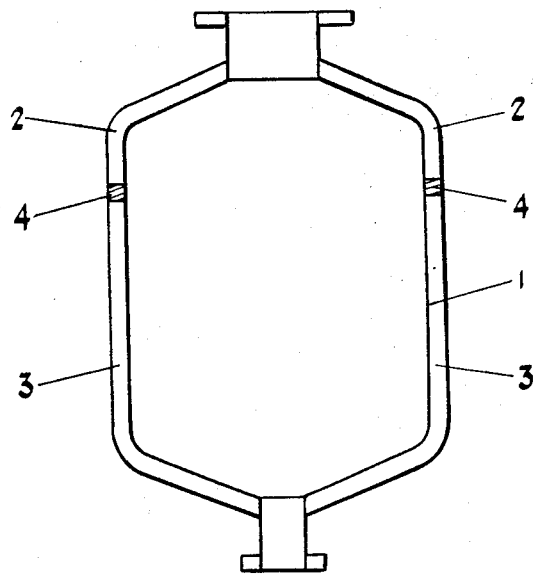
Figure 2:
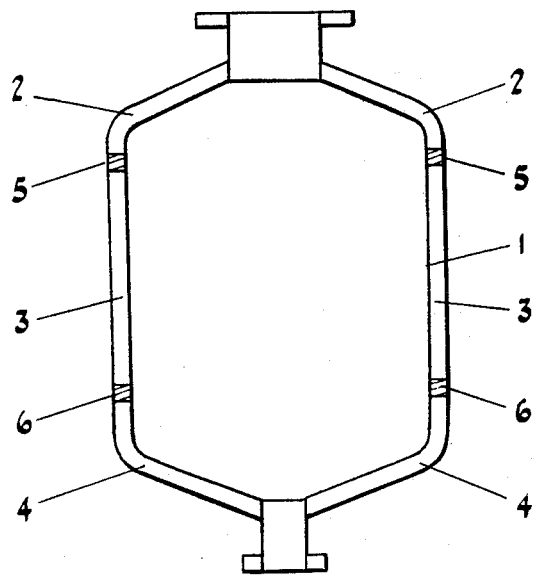

This invention relates to a process for the manufacture of synthetic linear fiber forming polyamides.

Synthetic linear fiber forming polyamides, known generically as the nylons, are formed by the polycondensation of diamines with dicarboxylic acids or by the polycondensation of aminocarboxylic acids. The diamines are preferably aliphatic diamines especially aliphatic diamines of the formula:

$$NH_2[CH_2]NH_2$$

where $n$ is an integer from 2 to 12, for example ethylene diamine, pentamethylenediamine, hexamethylenediamine, decamethylenediamine and dodecamethylenediamine. The diamines may also include cycloaliphatic diamines for example 1,3- or 1,4-diaminocyclohexane, and araliphatic diamines for example m- or p-xylylenediamine. The dicarboxylic acids are preferably aliphatic dicarboxylic acids, especially aliphatic dicarboxylic acids of the formula:

$$HO_2C[CH_2]_nCO_2H$$

where $n$ is an integer from 1 to 10, for example succinic acid, glutaric acid, adipic acid, sebacic acid and dodecanedioic acid. Other suitable dicarboxylic acids include cycloaliphatic, araliphatic and aromatic dicarboxylic acids, for example hexahydroterephthalic acid, hexahydro-p-xylylenedicarboxylic acid, p-xylylenedicarboxylic acid, terephthalic acid and isophthalic acid. The aminocarboxylic acids are preferably ω-amino aliphatic carboxylic acids. The derived lactams may also be used. Particular compounds of this class may be represented by one of the formulae:

$$NH_2[CH_2]_nCO_2H \text{ or } \begin{bmatrix} [CH_2]_n \\ NH-CO \end{bmatrix}$$

in which $n$ is an integer from 2 to 11, for example caprolactam, dodecanolactam, enantholactam and capryllactam. There may also be used aminocarboxylic acids of the cycloaliphatic series, for example 4-aminocyclohexanecarboxylic acid, 4-aminomethylcyclohexanecarboxylic acid and 4-aminocyclohexylacetic acid.

As particular examples of the synthetic linear fiber forming polyamides there may be mentioned the polycondensation product of adipic acid and hexamethylenediamine, namely polyhexamethylene adipamide (nylon 66) and polycaprolactam (nylon 6).

The polycondensation is effected by heating the polyamide forming ingredients, for example a mixture of diamine and dicarboxylic acid, desirably in approximately equimolecular proportions, or a salt of the diamine and dicarboxylic acid, or an amino acid or a derived lactam until condensation, with elimination of water, has proceeded to the desired degree.

The synthetic linear fiber forming polyamides are conveniently manufactured by heating an aqueous mixture of the polyamide-forming ingredients under pressure. Usually the process of manufacture is conducted in a pressure vessel which is initially partially filled with the aqueous liquid reaction mixture. As the polymerization proceeds the polymer forms as a viscous liquid in the lower part of the vessel and volatile materials pass into the steam which fills the upper part of the vessel. However, difficulties are sometimes encountered due to the decomposition of these volatile materials in the upper part of the vessel. The decomposition products tend to adhere to the upper walls of the vessel and form as irregular deposits which break away from time to time and contaminate the material being manufactured, thereby causing considerable wastage. A further difficulty is that in course of time the deposits may become so considerable as to require their complete removal, and this is found to be extremely troublesome and time consuming.

According to the present invention we provide a process for manufacturing synthetic linear fiber forming polyamides by heating in a vessel under pressure an aqueous liquid reaction mixture containing polyamide forming ingredients and allowing water to escape as steam wherein for at least some of the heating period a lower zone of the interior wall of the vessel is maintained at a temperature above the temperature of the vessel contents and at the same time an upper zone of the interior wall of the vessel is maintained at a temperature below the temperature of the lower zone.

The polyamide forming ingredients may be heated at temperatures within the range 110° C. to 300° C. for periods of time ranging from 1 hour to 6 hours. The pressure may vary from substantially atmospheric pressure up to 20 atmospheres.

During the time when heat is being supplied to the reaction mixture the lower zone of the interior wall of the vessel may be maintained at a temperature from 5° C. to 250° C. above the temperature of the vessel contents. The upper zone of the interior wall of the vessel may be maintained at a temperature which is from 0° C. to 200° C. lower than that of the lower zone during a part of the heating period.

In the manufacture of synthetic linear fiber forming polyamides deposits tend to form on the upper parts of the walls of heated reaction vessels more in the later stages of polymerization than in the early stages. To reduce deposit formation it is preferable to ensure that at least in the later stages of the reaction the upper part of the interior of the reaction vessel is not heated above the temperature of the vessel contents, that is the temperature of the upper zone of the interior wall of the vessel is not above the temperature of the vessel contents. In some circumstances it may be desirable to supply external heat to the top part of the reaction vessel during the earlier stages of the reaction so that there is substantially no temperature difference between the upper and lower parts of the vessel, that is the temperature of the upper zone of the interior wall of the vessel is substantially the same as that of the lower zone, but in the later stages it is advantageous to reduce the temperature of the top part or even to discontinue heating the top part altogether whilst heating of the bottom part is continued.

Conveniently the process of the invention may be conducted in an autoclave provided with separate heating jackets for heating the upper and lower parts, so that whilst the lower part of the vessel is being heated, heating of the upper part may be diminished or discontinued, or if this is desired omitted altogether. It is preferable to arrange that the upper heating jacket covers that part of the autoclave extending down to about the level occupied by the liquid-vapor boundary of the autoclave contents at the end of the polymerization.

Suitable forms of pressure vessel in which to conduct the process of the invention are represented in the accompanying drawings which are diagrammatic sectional views showing two different arrangements of heating jackets.

In FIGURE I the inner wall of the vessel is surrounded by an upper jacket 2 and a lower jacket 3 separated from each other at the junction 4.

In FIGURE II the inner wall 1 of the vessel is surrounded by an upper jacket 2, a middle jacket 3 and a lower jacket 4, the three jackets being separated from each other at the junctions 5 and 6.

The heating jackets for the vessels of FIGURES I and II are provided with connections (not shown) for introducing a supply of heating fluid which may be either heated liquid or vapor.

Using apparatus of the above kind according to the process of the invention it is possible to carry out a large number of polymerizations without the formation of troublesome deposits on the autoclave walls.

In the application of the process of the invention to the manufacture of polyhexamethylene adipamide a convenient way of proceeding is to charge an aqueous solution of hexamethylenediammonium adipate to a vessel having two or more separate heating jackets for supplying heat to different zones of the interior wall of the vessel such as that shown in FIGURE I or FIGURE II of the drawings. The vessel is closed and the solution is heated until the pressure reaches a value of from 190–260 p.s.i.g. Heating of the solution is effected by supplying heat to the lower zone of the interior wall of the vessel which is in contact with the solution by passing heating fluid through the heating jacket or jackets adjacent to the lower zone and also if desired by supplying heat to the upper zone of the interior wall of the vessel by passing heating fluid through the jacket or jackets adjacent to the upper zone. During this stage water present originally in the solution and that formed in the reaction is allowed to escape by bleeding off as steam. When, however, a substantial proportion of the water originally present, or formed in the reaction has been removed from the vessel so that the liquid contents of the vessel are substantially reduced in volume, and the level of the liquid contents has fallen, which stage corresponds with a temperature of the vessel contents within the range 230°–270° C., the temperature of the upper zone of the vessel, that is that part of the vessel above the liquid contents and in contact with vapor is reduced below that of the lower zone, if it is not already below it, by discontinuing or reducing the supply of heat to the upper zone while continuing to supply heat to the lower zone. Heating of the liquid contents is continued as necessary by applying heat to the lower zone until the polycondensation reaction is completed, the pressure being finally reduced to that of the atmosphere. The contents of the vessel are then discharged. When working under these conditions the interior of the vessel remains clean and free from deposits of decomposition products of the reaction mixture even after repeated use. The concentration of the aqueous solution of hexamethylenediammonium adipate originally charged to the autoclave may vary, for example between 45% and 95%.

The invention is illustrated by the following examples:

EXAMPLE 1

A 70% by weight aqueous solution of hexamethylene diammonium adipate is charged into an autoclave having an arrangement of heating jackets as shown in FIGURE I, the vessel being filled to a point just below the junction 4 of the top and bottom heating jackets. After charging heat is supplied to the autoclave by means of the bottom jacket only and the autoclave pressure raised to 240–260 p.s.i.g. and at the same time water of solution and reaction is bled off as vapor. When the temperature of the reaction mixture reaches 240°–270° C. pressure is reduced to atmospheric pressure and heating is continued or discontinued as required to maintain the correct temperature of the autoclave contents until the polymer is discharged. The polymer in the autoclave is held therein for a further 20 to 40 minutes and then discharged under nitrogen pressure.

The interior of the autoclave is clean and free from a deposit of reaction mixture decomposition products even after repeated use in the above manner.

EXAMPLE 2

An 80% by weight solution of hexamethylene diammonium adipate is charged into an autoclave having an arrangement of heating jackets as shown in FIGURE I, the vessel being filled above the junction 4 of the top and bottom heating jackets. After charging, heating is supplied to the autoclave by means of the top and bottom jackets and the pressure raised to 240–260 p.s.i.g. whilst bleeding off steam. When the volume in the autoclave has been reduced so that the level of the liquid contents is below the junction 4 heating by means of the upper jacket is discontinued. Conveniently this point of the heating cycle corresponds with an internal temperature of 240°–270° C. When this temperature is reached pressure reduction is also commenced and the process completed as in Example 1.

The interior of the autoclave remains clean and free from a deposit of reaction mixture decomposition products after repeated use in the above manner.

EXAMPLE 3

A 70% by weight solution of hexamethylene diammonium adipate is charged into an autoclave having an arrangement of heating jackets as shown in FIGURE II, the vessel being filled above the junction of the top and middle heating jackets. After charging heat is supplied to the autoclave by means of all the heating jackets and the autoclave pressure raised to 240–260 p.s.i.g. whilst water of solution and reaction is bled off as vapor. When the volume in the autoclave has been reduced so that the part of the autoclave heated by the top jacket is no longer covered by the reaction mixture heating by this jacket is discontinued. Processing then continues as in Example 1 up to the stage where autoclave contents are reduced to atmospheric pressure. At this stage heating by means of the middle heating jacket is discontinued leaving the bottom heating jacket on full or partial heating as may be required to maintain the correct temperature of the autoclave contents until the polymer is discharged.

The interior of the autoclave remains clean as in the previous examples.

What we claim is:

1. A process for the production of a synthetic linear fiber-forming polyamide under polymerization condition in a reaction vessel having separate heating zones comprising polymerizing an aqueous liquid reaction mixture of hexamethylene diammonium adipate within a temperature range of 110 to 300 degrees centigrade under a pressure of 1 to 20 atmospheres, vaporizing water and volatile polymerizable reactants from said reaction mixture, applying during at least the latter polymerization stage of the reaction a temperature differential to the liquid reaction mixture of 5 to 250 degrees centigrade above the temperature applied to the volatilized materials, said temperature applied to said volatilized materials being up to 200 degrees centigrade below the temperature of the liquid reaction mixture.

2. The process of claim 1 wherein a temperature differential is maintained after effecting a partial polymerization of the reaction mixture.

3. The process of claim 1 wherein during the initial polymerization stage, the temperature applied to the liquid reaction is substantially the same as the temperature applied to the volatile materials.

4. The process for the manufacture of polyhexamethylene adipamide by polycondensation of hexamethylene diammonium adipate comprising charging an aqueous reaction solution of hexamethylene diammonium adipate to a pressure reactor having at least two separate heating zones, closing said reactor, heating the contents by supplying heat until the pressure within the reactor reaches a value within the range of 190 to 260 pounds per square inch gauge, volatilizing water and volatile polymerizable reactants from said reaction solution, applying a heat to the reaction solution within the range of 230 to 270 degrees centigrade, applying a temperature to the volatilized materials the range of from 5° C. to 250° C. below the temperature applied to the reaction solution, removing volatilized water from the reactor, completing the polycondensation by continued heating of the reaction solution while reducing the pressure to atmospheric and subsequently discharging the liquid contents from the reactor.

5. The process of claim 4 in which the contents of the vessel are heated initially by supplying heat to both the upper and lower zones.

6. The process of claim 4 in which the contents of the vessel are heated by supplying heat to the lower zone only.

References Cited

UNITED STATES PATENTS

| 2,163,636 | 6/1939 | Spanagel | 260—78 |
| 2,361,717 | 10/1944 | Taylor | 260—78 |
| 2,562,796 | 7/1951 | Koch | 260—78 |
| 2,889,211 | 6/1959 | Rodenacher et al. | 260—78 |
| 2,923,699 | 2/1960 | Indest et al. | 260—78 |

HAROLD D. ANDERSON, Primary Examiner

U.S. Cl. X.R.

260—95

PO-1050
(5/69)

UNITED STATES PATENT OFFICE
CERTIFICATE OF CORRECTION

Patent No. 3,471,452          Dated October 7, 1969

Inventor(s) Ernest Haworth and John Norman Minford

It is certified that error appears in the above-identified patent and that said Letters Patent are hereby corrected as shown below:

In column 1, line 36, ---n--- was left out of the formula, it should be inserted as follows:

---      $NH_2[CH_2]_nNH_2$      ---

Signed and sealed this 23rd day of May 1972.

(SEAL)
Attest:

EDWARD M. FLETCHER, JR.
Attesting Officer

ROBERT GOTTSCHALK
Commissioner of Patents